United States Patent [19]

Weber

[11] Patent Number: 5,149,027
[45] Date of Patent: Sep. 22, 1992

[54] MULTIPLE LEG HEIGHT SNAP FIT CABLE HOLDER APPARATUS

[75] Inventor: William F. Weber, Allen, Tex.

[73] Assignee: Alcatel Network Systems, Inc., Richardson, Tex.

[21] Appl. No.: 831,221

[22] Filed: Jan. 31, 1992

[51] Int. Cl.⁵ .................................................. F16L 3/00
[52] U.S. Cl. ........................................ 248/68.1; 24/459; 248/73; 248/74.3; 248/911
[58] Field of Search ............... 248/57, 73, 74.1, 74.2, 248/74.3, 74.4, 74.5, 56, 68.1, 909, 906, 558, 71, 221.4, 65, 911; 24/457, 459; 411/920, 457; 403/3, 4

[56] References Cited

U.S. PATENT DOCUMENTS

| | | | |
|---|---|---|---|
| 2,931,607 | 4/1960 | McFarland | 248/74.1 |
| 2,981,513 | 4/1961 | Brown | 248/73 |
| 3,463,428 | 8/1969 | Kindorf et al. | 248/74.5 X |
| 3,755,764 | 8/1973 | Suzuki | 248/74.2 X |
| 3,789,800 | 2/1974 | Steudler, Jr. | 248/221.4 X |
| 4,356,987 | 11/1982 | Schmid | 248/74.1 X |
| 4,439,899 | 4/1984 | ReuBoiu et al. | 248/74.1 X |
| 4,645,154 | 2/1987 | Bly | 248/221.4 X |
| 4,835,933 | 6/1989 | Yung | 248/74.4 X |

FOREIGN PATENT DOCUMENTS

| | | | |
|---|---|---|---|
| 710034 | 9/1941 | Fed. Rep. of Germany | 248/73 |
| 1025169 | 4/1966 | United Kingdom | 248/73 |

Primary Examiner—David L. Talbott
Attorney, Agent, or Firm—Bruce C. Lutz; Dennis O. Kraft

[57] ABSTRACT

A snap fit cable holder in a U-shape with two legs is shown with snap fit projections on both the inside and outside of the legs of the holder and at different relative heights with respect to the bit portion of the device. In this manner, the legs can be inserted through first and second openings to be held by their inside edges of the openings or can be inserted in first and third openings to be held by the outermost edges of the first and third openings. This allows a single cable connector to be used with at least two different size cables. Further variations may be obtained by adjusting the thickness of the support base containing the openings.

7 Claims, 3 Drawing Sheets 5,149,027

MULTIPLE LEG HEIGHT SNAP FIT CABLE HOLDER APPARATUS

THE INVENTION

The present invention pertains generally to cable holders and more specifically to a snap fit cable holder. Even more particularly, it relates to a snap fit cable holder with legs which can be used with different size cables in accordance with the use of snap fit projections at different heights on the inside and the outside of the cable holder's legs.

BACKGROUND

Snap fit cable holders have been utilized in the past where more than one projection has been formed on one side of the cable holder leg. However, when such a cable holder is used on small diameter cables, there may be an excessive amount of leg projecting through the base which, in some instances, will interfere with other components. Further, such prior art cable connectors have, on occasion, been difficult to insert to the exact depth desired for a given application. In addition, the cable holders using more than one projection on one side of a leg have definite limitations as to incremental spacing depending upon material thickness. In other words, the material thickness needs to be much less than the spacing between clip projections to work properly, and such a limitation is not always compatible with the changes in cable sizes that need to be accommodated.

Prior art retainers have often provided "loose" or bundled retention of cables. It is however, often desirable, from a neatness or cable tracing standpoint, to have a "snug" fit of cables in a single layer.

The present invention solves both of the above mentioned shortcomings of the prior art by using different thickness base or cable support plates containing the openings to provide one adjustment of cable size and uses either the inside projections or the outside projections on the legs of the cable holder to provide for variations in cable thickness where the cable passes through the holder in a given direction. When the four leg embodiment of the inventive concept is used, two additional height dimensions can be accommodated by running cable through the holder from the orthogonal direction as compared to that first referenced.

In the above manner, a great variety of cable thicknesses can be accommodated using a single cable connector and merely altering the orientation of cable through the connector, altering whether the holes used coact with the catches on the inside or the outside of the legs and using different supports whose thickness is chosen in accordance with the diameter of cables to be fastened down in a given instance.

It is therefore an object of the present invention to provide a cable connector which can be easily removed from base openings and can provide a snug fit for each of a variety of different cable diameters.

Other objects and advantages of the present invention will be apparent from a reading of the specification and appended claims in conjunction with the drawings wherein:

DETAILED DESCRIPTION

Figure 1:
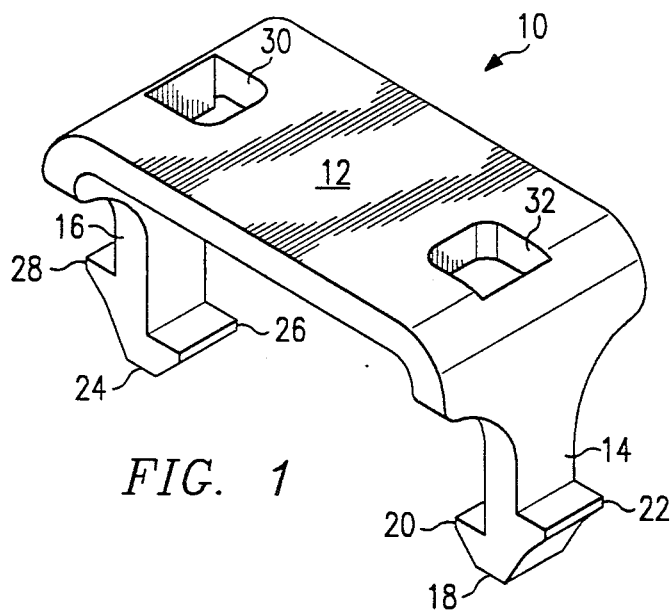
FIG. 1 is isometric view of a two-legged version of the present inventive concept.

In FIG. 1 a U-shaped unitary part 10 for use as a clamp is illustrated with a bit portion 12 and side extensions 14 and 16. The side extension 14 is configured in the form of a leg having an extremity 18 and first and second snap fit projections 20 and 22. Leg 16 has a similar extremity 24 and also snap fit projections 26 and 28. While not required to practice the invention, the device 10 has openings 30 and 32 in the bit portion 12 for use in ease of manufacturing of the inside of the legs 14 and 16. It will be noted that the projections 20 and 26 are a first distance from the bit portion 12 while the projections 22 and 28 are a second and lesser distance from bit portion 12. It may also be noted that the projections 20 and 26 are on the inside of legs 14 and 16 respectively, while the projections 22 and 28 are on the outside of legs 14 and 16.

Figure 2:
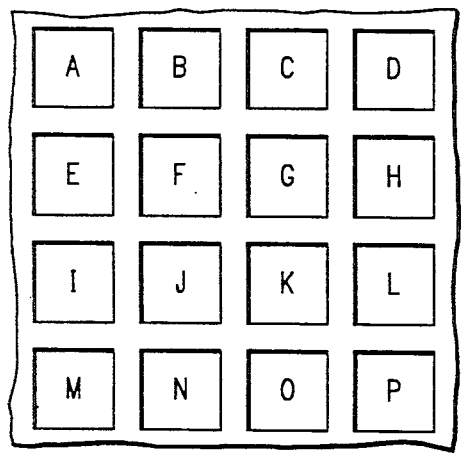
FIG. 2 illustrates a base support including a plurality of openings used in conjunction with the cross-sectional views of a clamp as shown in FIGS. 3 through 6, 8 and 9 to teach the manner in which the clamp is used.

In FIG. 2 a grid of openings in a base support or plate 35 is shown with the openings labeled A through P. This provides a symmetrical grid of square openings for simplicity in design and universal use in various cable support configurations. However, only the openings required for specific application could be formed if so desired. Also, the openings could be circular or of other shapes with appropriate modification of the snap fit projections.

Figure 3:
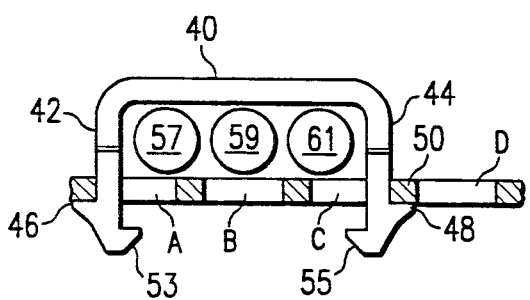
FIG. 3 illustrates an end or cross-sectional view of a clamp mounted in the base of FIG. 2 using outside snap projections of the legs.

In FIG. 3 a side view of the clamp 10 of FIG. 1 is illustrated inserted in a base as shown in FIG. 2. In FIG. 3 a bit portion 40 has legs 42 and 44 with projections 46 and 48 coacting with a plate generally designated as 50. FIG. 3 thus shows the cable clamp inserted in openings A and C with the tabs 46 and 48 coacting with the outside edges or furthermost edges of these two openings. Also shown on the legs 42 and 44 are inside projections 53 and 55. Between bit portion 40 and plate 50 are cables 57, 59 and 61.

Figure 4:
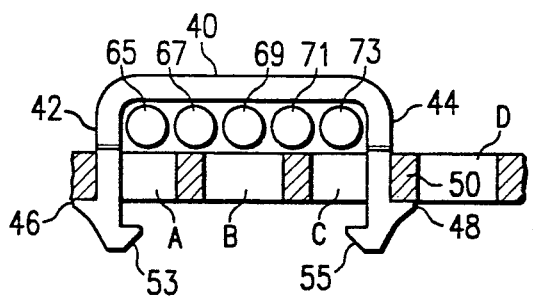
FIG. 4 is an end view of the cable clamp used in the same manner as FIG. 3 except with a thicker base thus properly enclosing smaller diameter cable.

In FIG. 4 the same designations as used in FIG. 3 are used with the exception of the designations for the cables. It will be noted that since the thickness of plate 50 is thicker, the diameter of the cables designated as 65 through 73 are snugly confined while of a smaller diameter.

Figure 5:
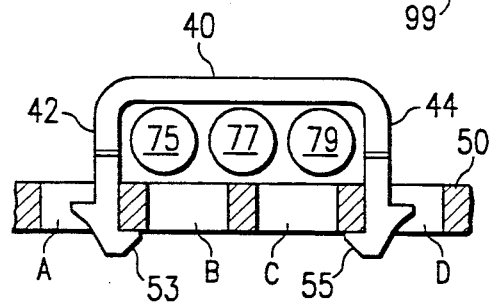
FIG. 5 illustrates an end view of the clamp using the same thickness base material as FIG. 4 but accommodating larger diameter cable since it uses the inside projection of the legs.

In FIG. 5, the inside tabs or projections 53 and 55 are used to provide the snap fit action and are used with openings A and D at their closest or nearest edges as opposed to the farthest edges of the openings when used with the outside projections of FIGS. 3 and 4. Even using the thicker base 50, cables of a diameter similar to that previously used in FIG. 3, may be accommodated.

Figure 6:
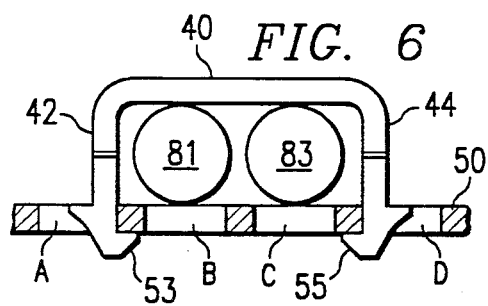
FIG. 6 illustrates a view of the clamp of FIG. 5 using thinner base material thereby accommodating larger diameter cables.

In FIG. 6 a base material of the same thickness as FIG. 3 is used while again using the lower snaps or projections 53 and 55 to allow clamping of much larger cable sizes shown as cables 81 and 83.

Figure 7:
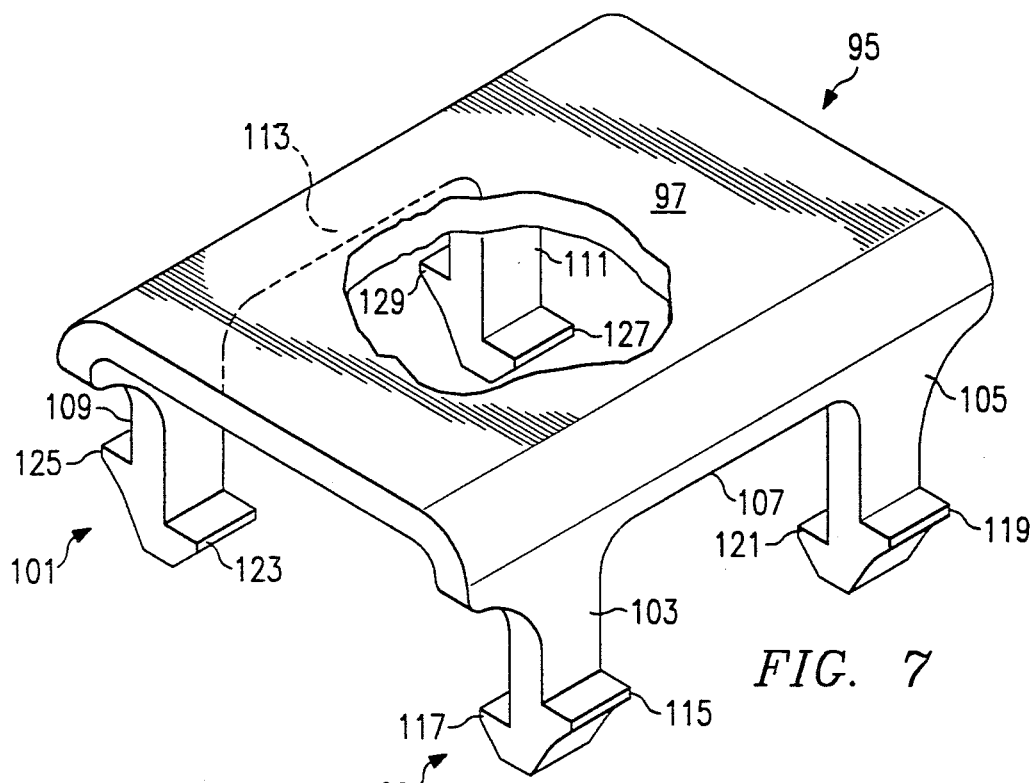
FIG. 7 illustrates a four-legged version of the connector of FIG. 1 wherein cables can be inserted either longitudinally or transversely between the sets of legs to accommodate additional cable heights as illustrated in following FIGS. 8 and 9.

FIG. 7 illustrates a four-legged version of the cable clamp of FIG. 1 which provides even more versatility. In FIG. 7 the entire clamp is designated as 95 with the main bit portion being labeled 97. The bit portion 97 has first and second side extensions 99 and 101. Side extension 99 includes a first leg 103 and a second leg 105. The legs 103 and 105 in combination with a further bit portion 107 define an enclosure for cables in a transverse direction through the clamp 95. Legs or sides 99 and 101, in combination with main bit portion 97, define a longitudinal enclosure or restrictive area for cables mounted in a lengthwise direction through the clamp 95. The side 101 has legs 109 and 111 corresponding to legs 103 and 105 and a further bit portion 113 corresponding to bit portion 107. The leg 103 has an outside projection 115 and an inside snap fit projection 117. The remaining legs have similarly designated inside and outside projections for providing snap fit action.

Figure 11:
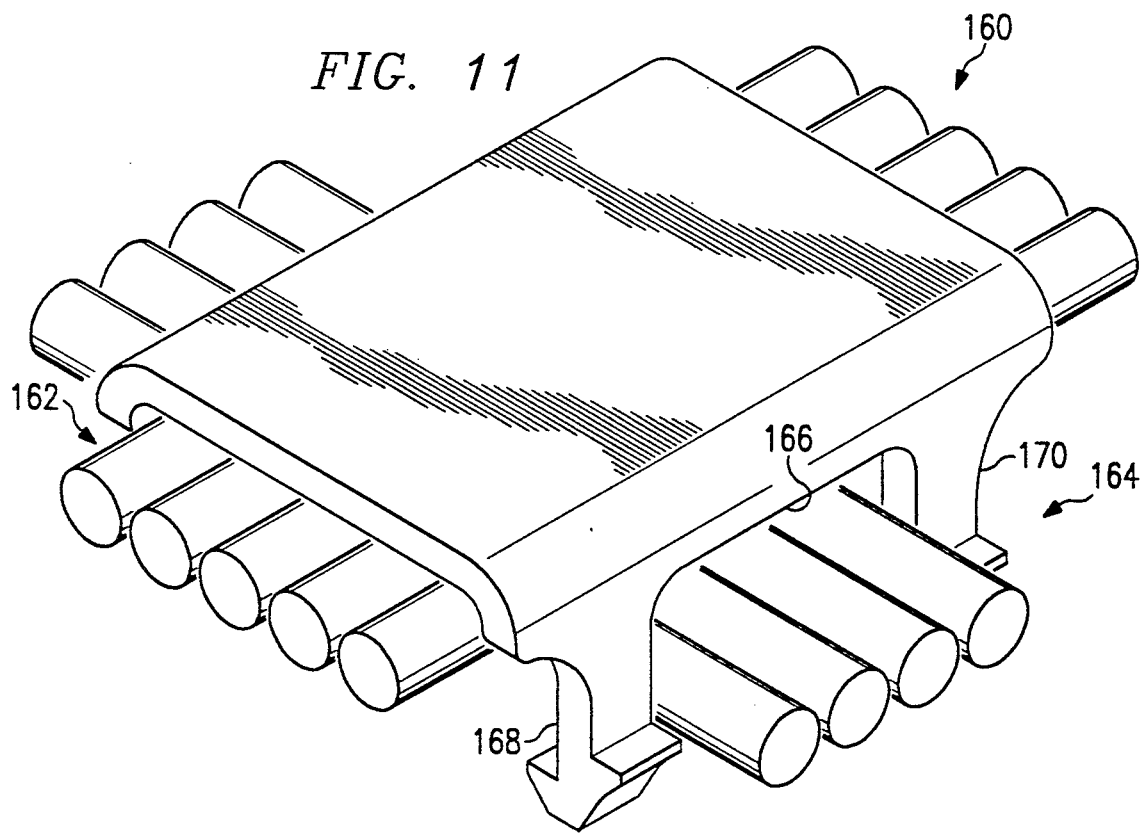
FIG. 11 illustrates in isometric format that the concept of FIG. 7 may be utilized to clamp two sets of cables one orthogonal to the other with the top layer being in the longitudinal orientation of the clamp.

From the above it will be apparent that the clamp of FIG. 7 can be used to clamp cables passing through in the longitudinal direction as well as the transverse direction and in fact, can be used to clamp cables running in both directions simultaneously as will be observed from FIG. 11.

Figure 8:
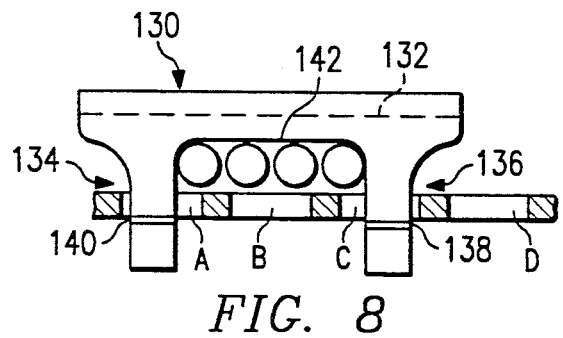
FIG. 8 illustrates a side view of the clamp of FIG. 3 with smaller diameter cables held under the clamp in a transverse direction as compared to those cables of FIG. 3.

It will be realized that FIGS. 3 through 6 depict not only an end view of FIG. 1 but an end view of FIG. 7. FIG. 8 illustrates a side view of the four-legged device of FIG. 7. In FIG. 8 a main bit portion 130 is shown with a dash line 132 showing the inside or underside of main bit portion 130. Main bit portion 130 corresponds to bit portion 40 of FIG. 3 if representing FIG. 7. The legs such as 134 and 136 are illustrated with outside or upper snap catches 138 and 140 coacting with openings I and K and other legs (not shown) coacting with A and C in the base. While connected in a manner similar to that of FIG. 3 where the cables are running in a longitudinal direction, in the transverse view of FIG. 8, the cables must be of a smaller maximum diameter. Inside tabs which are not illustrated but would correspond to 53 and 55 are also in place and inoperative for the usage of FIG. 8.

Figure 9:
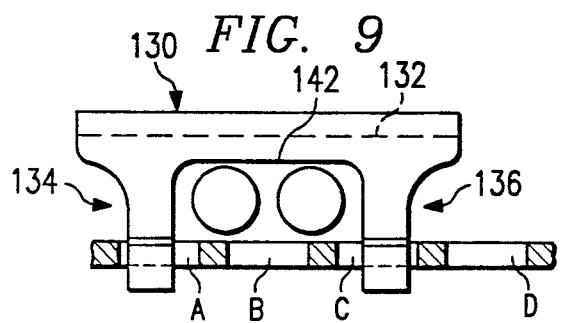
FIG. 9 illustrates a side view of the clamp of FIG. 6 using smaller diameter cables in a transverse direction as compared to the actual illustration of cables used in FIG. 6.

FIG. 9 illustrates using the lower clips or projections corresponding to projections 53 and 55 of FIG. 3 and illustrates that the same maximum diameter cables can be used in the transverse direction through a four-legged clip of FIG. 9 as shown in the longitudinal direction for FIG. 3 using the dimensions illustrated. However, the bit portion 142 between legs 134 and 136 could be made higher or lower to accommodate a fourth size for a given base thickness. In other words, the cable sizes illustrated in FIGS. 3, 6, 8 and 9, may all be different in diameter and still be snugly enclosed in a single layer depending upon the orientation of the cables and the use of inside or outside snap fit projections.

Figure 10:
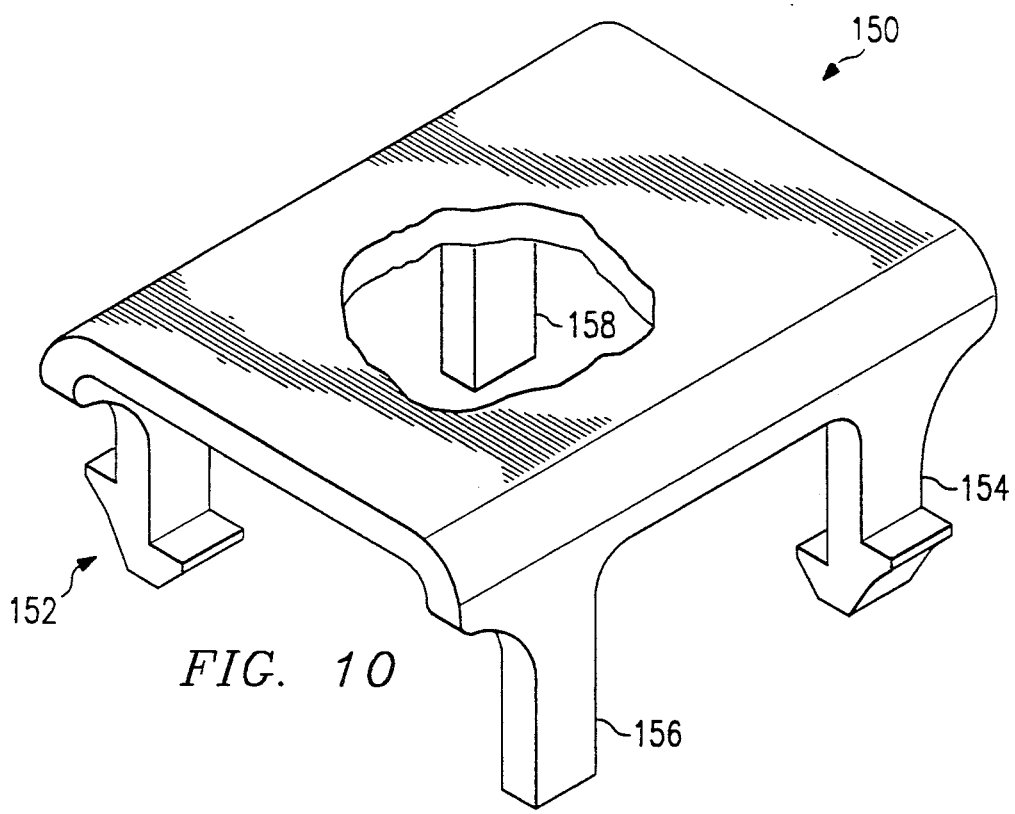
FIG. 10 is an isometric view of a modification of FIG. 7 showing that not all of the legs in the concept need to have the snap fit projections.

While FIG. 7 illustrates the inside and outside tabs on all the legs, FIG. 10 shows a clamp 150 having legs 152 and 154 configured as shown in FIG. 7 with the remaining legs 156 and 158 without the snap fit projections. Such a part would be somewhat easier to machine or mold and would be simpler to install and remove. Other modifications in the placement of the snap projections will also be apparent to those skilled in the art.

FIG. 11 illustrates a clamp 160 having a first set of cables 162 running in a longitudinal direction and a further set of cables 164 situated beneath cables 162 and running in a transverse direction. A bit portion 166 between legs 168 and 170 could well be used in the manner shown in FIG. 8 to contain cables 164 and similar size cables 162 may be contained in a manner similar to that shown in FIG. 4. Using the lower or inside projections, different size cables could be placed in the upper and lower positions such as the different cable sizes shown, transverse and lengthwise in FIGS. 9 and 4.

OPERATION

While the operation of the present inventive concept will be reasonably apparent to those skilled in the art of cable retainers from the Detailed Description given above, a summary explantion will be provided herein. If it is desired to use the clip of FIG. 1, cables are first laid down on a support having at least some openings or a grid of openings such as shown in FIG. 2. The legs of clip 10 may then be inserted in the openings that are on either side of the cable as laid down. If the cables are roughly the size of that shown in FIG. 3, the outside tabs 22 and 28 of FIG. 1 may be used in holes spaced corresponding to A and C to fasten the cables. If, on the other hand, the cables were somewhat larger such as shown in FIG. 6, the inside tabs 20 and 26 could be used on the adjacent edges of openings such as A and D to provide the cable retention feature. As also explained, by varying the thickness of the support, different size cables could be snugly retained such as shown in FIG. 4, where the support thickness is considerably greater than shown in FIG. 3. FIG. 4, however, uses the same tabs for retention as shown in FIG. 3.

If a four-leg clip such as shown in FIG. 7 is utilized, more options are available as to retaining cables in a snug one-layer of cables fit. As illustrated in FIGS. 3 and 6, two different size cables can be run in the longitudinal direction through the clip 95 of FIG. 7, and with appropriate dimensions between the retaining clips and the bit portion 107, two additional sizes could be run in the transverse direction through clip 95 between legs 103 and 105. FIGS. 8 and 9 show two different size cables run in this transverse direction, although, due to the dimensions of bit portion 107 relative the snap fit tabs on the legs, the cables of FIG. 9 are substantially identical with that of FIG. 3. The dimensions illustrated are in accordance with existing requirements for one embodiment of the inventive concept. However, it will be readily apparent to one skilled in the art how to make the clip of FIG. 7 provide a snug retention of four different size cables.

As mentioned previously, FIG. 10 illustrates that not all of the legs need the snap fit retention tabs assuming there is some reason for requiring space under certain openings, etc.

Although not illustrated, the concept includes the idea of having multiple snap projections on the inside and/or outside if more cable size snug fit retention capability is required.

As suggested previously and as illustrated in FIG. 11, the concept can be used to retain cables in at least two directions simultaneously with the bit portion 166 between legs 168 and 170 retaining the lower layer of cables 164 and the main bit portion of the retainer, and the tops of cables 164 providing a snug retention of the layer of cables 162. While the cables 162 and 164 are shown as being of the same diameter, the design of the clip can easily be such that they can be different diameters. Further, while the bit portion 166 is shown as providing a snug fit for cables 164, the main bit portion in combination with the snap tabs, can merely be used to provide a snug fit for the two layers of cables 162 and 164 with the bit portion 166 merely being used for structural integrity and stiffness of the retainer 160.

Although I have illustrated several embodiments of my inventive concept and have discussed others, it is apparent that further modifications will be realized by those skilled in the art. Therefore, I wish to be limited not by the information contained herein, but only by the scope of the appended claims wherein I claim.

I claim:

1. Cable holder apparatus comprising, in combination:
   U-shaped flexible material having a main bit portion with first and second side portions extending from said main bit portion to form a plurality of legs and said main and each of said side portions including said legs having interior and exterior surfaces, said interior surfaces facing one another, the legs of said side portions each having;
   interior and exterior surface projections for coaction with an opening in a base and said side portions having extremities extending a distance X from said interior surface of said main portion as viewed from an end of said U-shaped flexible material;
   said side portions each having an opening therein thereby defining two legs extending to the extremity of said portion which legs are shorter than the distance X as viewed from a side of said U-shaped flexible material; and
   said interior and exterior surface projections each having holding surfaces which holding surfaces are different distances from the extremities of said legs whereby different size cables may be secured in accordance with the holding surface utilized.

2. The method of snugly holding a single layer row of different size cables with a single snap holder having flexible holding legs comprising the steps of:
   placing snap fit projections at a first distance on an inside portion of at least one leg to hold a first size cable, where said inside portion faces a further leg; and
   placing snap fit projections at a second distance on an outside portion of said at least one leg to hold a second size cable.

3. The method of snugly holding a single layer row of different size cables with a single snap holder having flexible holding legs having interior and exterior holding projections of the same type situated at different distances from the ends of said legs comprising the steps of:
   inserting legs of the holder into two openings having a their closest surfaces at substantially the distance between interior surfaces of said legs for holding a first cable size; and
   inserting legs of the holder into two openings having a their farthest surfaces at substantially the distance between exterior surfaces of said legs for holding a second cable size.

4. The method of providing a multilevel cable holding arrangement comprising the steps of:
   forming rectangular openings in a base support wherein the distance between the furthest apart edges of a first and second opening is X and the distance between the closest edges of said first and a third opening is Y; and
   inserting a cable holding clip, having different height inside and outside snap fit projections on legs thereof and further having a distance between facing inside portions of said legs of greater than Y and a distance between outside portions of said legs being less than X, into a first pair of openings corresponding in spacing to said first and second openings to clamp cable of a given diameter and into a second pair of openings to clamp cable corresponding in spacing to said first and third openings to clamp cable of a diameter greater than said given diameter.

5. A multilevel cable holding arrangement comprising, in combination:
   a base support having a grid of openings;
   a snap fit cable clamp, having different level snap fit projections on given leg facing inside as compared to similar snap fit projections on said given leg outsides using the closest edges of first and second spaced apart openings to provide clamping for a given maximum diameter cable using the furthest edges of first and third spaced apart openings to provide clamping for a second maximum diameter cable different from said given diameter cable, inserted in openings of said base support.

6. Apparatus as claimed in claim 5 wherein:
   said grid is symmetrical; and
   said openings are rectangular.

7. A cable holder comprising, in combination:
   U-shaped flexible material having a bit portion and first and second legs extending from said bit portion, said first and second legs each having inside and outside portions, said inside portions facing one another;
   first snap fit projections on each of said leg outsides and second snap fit projections on each of said leg insides, said first snap fit projections being a different distance from said bit portion as compared to the distance from said bit portion to said second snap fit projections.

* * * * *